United States Patent
Kimura

(10) Patent No.: US 12,238,259 B2
(45) Date of Patent: Feb. 25, 2025

(54) IMAGE PROCESSING METHOD, IMAGE PROCESSING APPARATUS, STORAGE MEDIUM, MANUFACTURING METHOD OF LEARNED MODEL, AND IMAGE PROCESSING SYSTEM

(71) Applicant: CANON KABUSHIKI KAISHA, Tokyo (JP)

(72) Inventor: Yoshinori Kimura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 427 days.

(21) Appl. No.: 17/732,609

(22) Filed: Apr. 29, 2022

(65) Prior Publication Data

US 2022/0368877 A1  Nov. 17, 2022

(30) Foreign Application Priority Data

May 13, 2021 (JP) ................................. 2021-081785

(51) Int. Cl.
*H04N 13/128* (2018.01)
*G06T 7/571* (2017.01)
(Continued)

(52) U.S. Cl.
CPC ........... *H04N 13/128* (2018.05); *G06T 7/571* (2017.01); *G06T 7/593* (2017.01); *H04N 23/676* (2023.01);
(Continued)

(58) Field of Classification Search
CPC .............. H04N 13/128; H04N 23/676; H04N 2013/0081; G06T 7/571; G06T 7/593;
(Continued)

(56) References Cited

U.S. PATENT DOCUMENTS 8,325,241 B2 * 12/2012 Yoshioka ............... H04N 23/80
348/340
9,041,824 B2 * 5/2015 Lelescu ................ H04N 13/128
348/218.1
(Continued)

FOREIGN PATENT DOCUMENTS

| JP | 6370348 B2 | 8/2018 |
| JP | 2020166628 A | 10/2020 |
| WO | 2019065260 A1 | 4/2019 |

OTHER PUBLICATIONS

Busam "SteReFo: Efficient Image Refocusing with Stereo Vision" ICCV. 2019: pp. 1-10.

*Primary Examiner* — Gregory M Desire
(74) *Attorney, Agent, or Firm* — ROSSI, KIMMS & McDOWELL LLP

(57) ABSTRACT

An image processing method includes a first step of acquiring a first image having disparity information and refocus information, and a second step of inputting the first image or the disparity information and the refocus information into a machine learning model, and of generating a second image having an in-focus position different from an in-focus position of the first image based on the refocus information. The refocus information is information on a distance between the in-focus position of the first image and the in-focus position of the second image.

12 Claims, 10 Drawing Sheets

(51) Int. Cl.
  *G06T 7/593* (2017.01)
  *H04N 5/232* (2006.01)
  *H04N 23/67* (2023.01)
  *H04N 13/00* (2018.01)

(52) U.S. Cl.
  CPC ............... *G06T 2207/10148* (2013.01); *G06T 2207/20081* (2013.01); *G06T 2207/20084* (2013.01); *H04N 2013/0081* (2013.01)

(58) Field of Classification Search
  CPC . G06T 2207/10148; G06T 2207/20081; G06T 2207/20084
  See application file for complete search history.

(56) References Cited

U.S. PATENT DOCUMENTS

| | | | | |
|---|---|---|---|---|
| 9,986,224 | B2* | 5/2018 | Mullis | H04N 23/951 |
| 10,043,290 | B2* | 8/2018 | Hayasaka | G06T 7/97 |
| 11,024,046 | B2* | 6/2021 | Venkataraman | G06N 3/045 |
| 11,531,862 | B2* | 12/2022 | Seki | G06V 20/10 |
| 11,575,882 | B2* | 2/2023 | Jin | G09G 3/001 |
| 11,600,025 | B2 | 3/2023 | Hiasa | |
| 11,605,174 | B2* | 3/2023 | Shan | G06T 5/20 |
| 11,615,546 | B2* | 3/2023 | Venkataraman | G06N 3/08 382/100 |
| 2021/0377432 | A1 | 12/2021 | Hayasaka et al. | |

* cited by examiner

IMAGE PROCESSING METHOD, IMAGE PROCESSING APPARATUS, STORAGE MEDIUM, MANUFACTURING METHOD OF LEARNED MODEL, AND IMAGE PROCESSING SYSTEM

BACKGROUND OF THE INVENTION

Field of the Invention

The present invention relates to an image processing method for generating a refocus image with high accuracy from two-viewpoint images using machine DL (deep learning).

Description of the Related Art

Benjamin Busam et al. "SteReFo: Efficient Image Refocusing with Stereo Vision" ICCV (2019) ("Busam et al.") discloses a method of estimating a depth from two-viewpoint images using DL, then decomposing one of the two-viewpoint images in a depth direction based on the depth, adding them up with a blur for each depth, and generating a refocus image. Refocus is image processing for estimating an image having an in-focus position that is virtually moved from an in-focus position (focal plane) of each two-viewpoint image. The two-viewpoint images are images of the same object captured at laterally (horizontally) different viewpoints, that is, images with disparity (parallax) in a lateral (horizontal) direction.

The method disclosed in Busam et al. requires a depth map corresponding to the two-viewpoint images for DL. Since the depth map generally has a finite resolution, it is difficult to generate a refocus image refocused on an arbitrary in-focus position. Therefore, a highly accurate refocus image cannot be generated.

SUMMARY OF THE INVENTION

The present invention provides an image processing method, an image processing apparatus, a storage medium, a manufacturing method of a learned model, and an image processing system, each of which can generate a refocus image from two-viewpoint images with high accuracy using DL.

An image processing method according to one aspect of the present invention includes a first step of acquiring a first image having disparity information and refocus information, and a second step of inputting the first image or the disparity information and the refocus information into a machine learning model, and of generating a second image having an in-focus position different from an in-focus position of the first image based on the refocus information. The refocus information is information on a distance between the in-focus position of the first image and the in-focus position of the second image.

An image processing apparatus according to another aspect of the present invention includes at least one processor, and at least one memory coupled to the at least one processor storing instructions that, when executed by the at least one processor, cause the at least one processor to function as an acquiring unit configured to acquire a first image having disparity information and refocus information, and a generating unit configured to input the first image or the disparity information and the refocus information into a machine learning model, and to generate a second image having an in-focus position different from an in-focus position of the first image based on the refocus information. The refocus information is information on a distance between the in-focus position of the first image and the in-focus position of the second image.

A manufacturing method of a learned model includes the steps of a first step of acquiring a first image having disparity information and a ground truth image, a second step of acquiring refocus information on a distance between an in-focus position of the first image and an in-focus position of the ground truth image, and a third step of learning a machine learning model using the ground truth image and the second image generated by inputting the first image or the disparity information and the refocus information into the machine learning model. The third step inputs the first image or the disparity information into the machine learning model, generates the second image having an in-focus position different from an in-focus position of the first image based on the refocus information, and learns the machine learning model based on an error between the second image and the ground truth image.

An image processing system according to another aspect of the present invention includes a first apparatus, and a second apparatus communicable with the first apparatus. The first apparatus includes a transmitting unit configured to transmit a request that causes the second apparatus to process a first image having disparity information. The second apparatus includes a receiving unit configured to receive the request transmitted from the transmitting unit, an acquiring unit configured to acquire the first image or the disparity information and refocus information, and a generating unit configured to input the first image or the disparity information and the refocus information into a machine learning model, and to generate, based on the refocus information, a second image having an in-focus position different from an in-focus position of the first image based on the refocus information. The refocus information is information on a distance between the in-focus position of the first image and the in-focus position of the second image.

Further features of the present invention will become apparent from the following description of exemplary embodiments with reference to the attached drawings.

DESCRIPTION OF THE EMBODIMENTS

Figure 1:
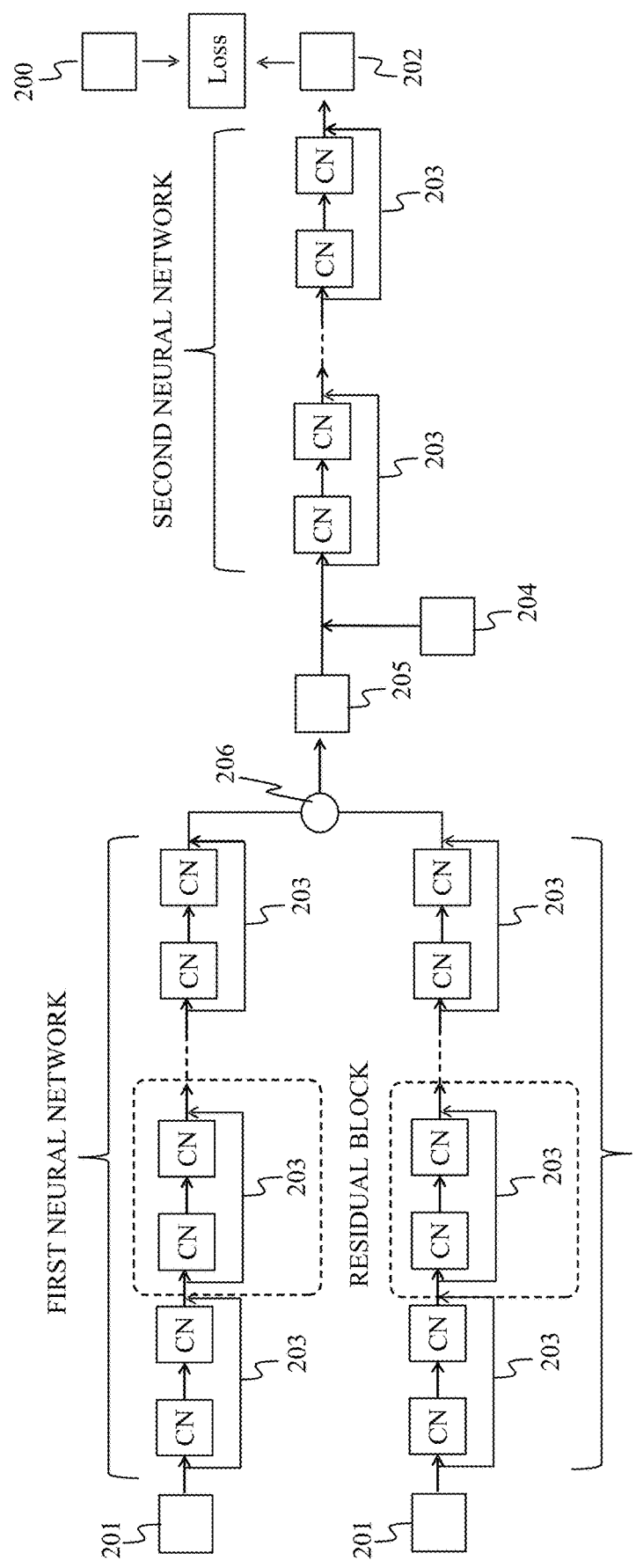
FIG. 1 illustrates a learning flow of a neural network according to a first embodiment.

Referring now to the accompanying drawings, a detailed description will be given of embodiments according to the present invention. Corresponding elements in respective figures will be designated by the same reference numerals, and a duplicate description thereof will be omitted.

A description will now be given of a gist of each embodiment before a specific description of each embodiment is given. Each embodiment generates a refocus image from two-viewpoint images with high accuracy using DL. Image processing with DL uses a neural network. The neural network uses a bias that is added to a filter to be convolved with an image, and an activation function that performs a nonlinear transformation. The filter and bias are called weights and generated by learning from training images. Each embodiment uses two-viewpoint images and corresponding focus-bracketing images as the training images. The focus-bracketing images are a plurality of images captured by actually moving in-focus positions of two-viewpoint images. A multidimensional array obtained in an intermediate layer of the neural network as a result of repeating convolving the filter, adding the bias, and performing a nonlinear transformation for an image is called a feature map. Of the dimensions of the feature map, the first and second dimensions are called vertical and horizontal (longitudinal and lateral) dimensions, and the third dimension is called a depth or channel dimension.

Figure 10:
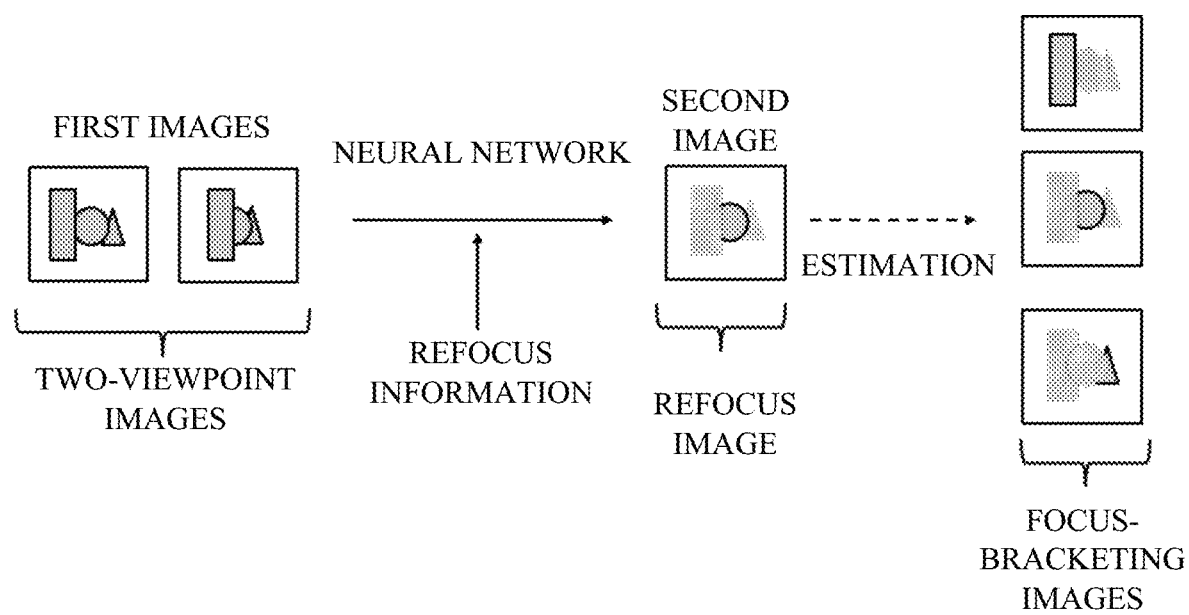
FIG. 10 explains an outline of each embodiment.

Referring now to FIG. 10, a description will be given of an outline of each embodiment. In each embodiment, two-viewpoint images (first images) and refocus information are input to the neural network to generate a refocus image (second image). The refocus image is an image having an in-focus position virtually moved from an in-focus position of each two-viewpoint image. Alternatively, one of a plurality of focus-bracketing images captured by actually moving the in-focus position of the two-viewpoint image may be regarded as a refocus image. A moving amount of the in-focus position is specified by the refocus information.

Each embodiment generates a refocus image with high accuracy by estimating disparity information in a vertical direction of the focus-bracketing images as a ground truth image, using the neural network, disparity information in a horizontal direction extracted from the two-viewpoint images, and the refocus information. This image processing method is merely illustrative, and each embodiment is not limited to this example. Details of other image processing methods and the like will be described in the following embodiments.

First Embodiment

A description will now be given of an image processing system according to a first embodiment of the present invention. This embodiment leans and executes image processing for generating a refocus image from two-viewpoint images using a neural network.

Figure 2:
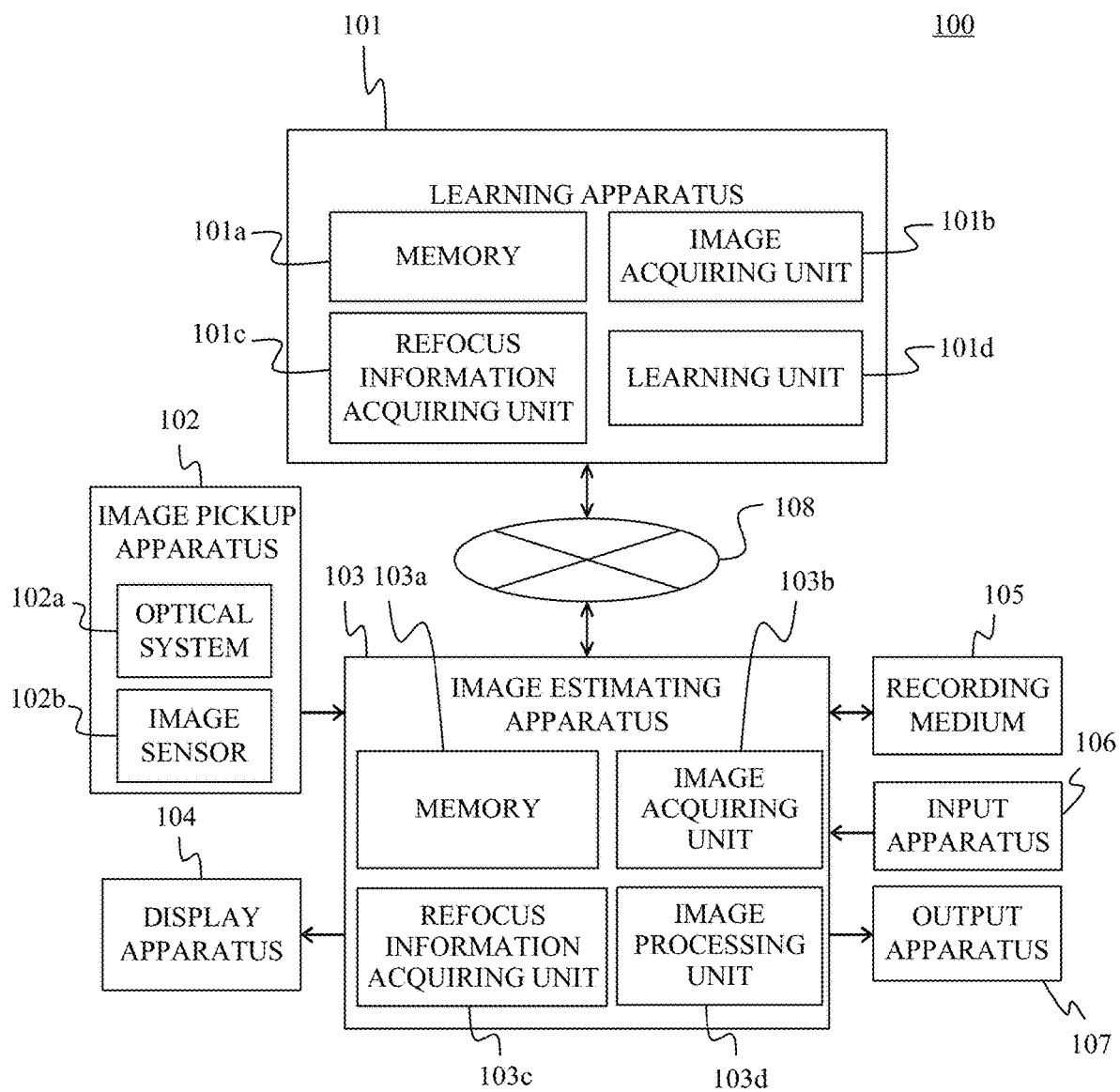
FIG. 2 is a block diagram of an image processing system according to the first embodiment.
Figure 3:
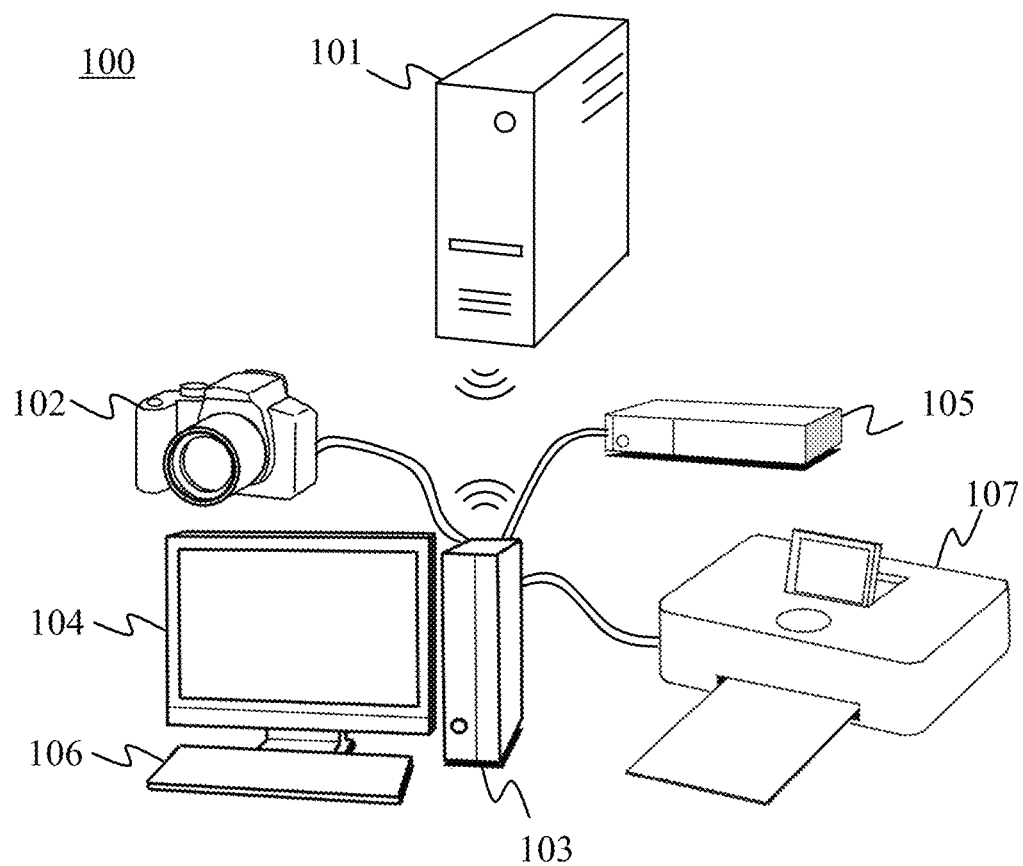
FIG. 3 illustrates a learning flow of the neural network according to the first embodiment.

FIG. 2 is a block diagram of an image processing system 100 according to this embodiment. FIG. 3 is an external view of the image processing system 100. The image processing system 100 includes a learning apparatus 101, an image pickup apparatus 102, an image estimating apparatus 103, a display apparatus 104, a recording medium 105, an input apparatus 106, an output apparatus 107, and a network 108.

The learning apparatus (image processing apparatus) 101 includes a memory 101a, an image acquiring unit 101b, a refocus information acquiring unit 101c, and a learning unit 101d.

The image pickup apparatus 102 includes an optical system 102a and an image sensor 102b. The optical system 102a collects light from an object to the image pickup apparatus 102. The image sensor 102b receives an optical image of the object formed via the optical system 102a and acquires a captured image (two-viewpoint image). The image sensor 102b is, for example, an imaging plane phase difference sensor. The imaging plane phase difference sensor is an image sensor in which one pixel includes one microlens and a plurality of photoelectric conversion elements (photodiodes and the like). By recording light fluxes that have passed through different pupil areas in the optical system (imaging optical system) by the photoelectric conversion elements, images from a plurality of viewpoints can be simultaneously acquired. In this embodiment, one pixel includes two horizontally independent photoelectric conversion elements, and two-viewpoint images can be simultaneously acquired which corresponds to images made by viewing the same object by the right eye and the left eye. The image pickup apparatus 102 provided with the imaging plane phase difference sensor is mainly used autofocusing (AF) on an object. The image pickup apparatus 102 according to this embodiment is not limited to this configuration and may be, for example, a stereo camera as long as two-viewpoint images can be acquired. In that case, the image sensor 102b is a CCD (Charge Coupled Device) sensor, a CMOS (Complementary Metal-Oxide Semiconductor) sensor, or the like. A memory for storing the acquired two-viewpoint images, a display unit for displaying these acquired two-viewpoint images, a transmitting unit for transmitting these two-viewpoint images to the outside, an output unit for storing these two-viewpoint images in an external storage medium, and the like are unillustrated. A control unit that controls each component in the image pickup apparatus 102 is also unillustrated.

The image estimating apparatus (image processing apparatus) 103 includes a memory 103a, an image acquiring unit 103b, a refocus information acquiring unit 103c, and an image processing unit (generating unit) 103d. The image estimating apparatus 103 performs image processing in which the image processing unit 103d generates a refocus image based on the two-viewpoint images acquired by the image acquiring unit 103b and the refocus information acquired by the refocus information acquiring unit 103c. The two-viewpoint images may be images captured by the image pickup apparatus 102 or images stored in the recording medium 105.

Refocus information is a moving amount of the in-focus position of the two-viewpoint image. That is, the refocus information is the moving amount of the in-focus position when the refocus image is generated by virtually moving the in-focus position of the two-viewpoint image. The refocus information may be set to a moving amount of an in-focus position in acquiring a plurality of focus-bracketing images by capturing the same object at in-focus positions different from those of the two-viewpoint images because a refocus image is an estimation of one of the focus-bracketing images. The refocus information may use a predetermined amount or may use an amount specified by the user via the input apparatus 106.

The neural network is used for the image processing, and weight information is read out of the memory 103a. The weights are learned by the learning apparatus 101, and the image estimating apparatus 103 reads the weight information from the memory 101a in advance via the network 108 and stores it in the memory 103a. The weight information to be stored may be a numerical value of the weight itself or an encoded format. Details of weight learning and image processing using the weights will be described below.

The refocus image is output to at least one of the display apparatus 104, the recording medium 105, and the output apparatus 107. The display apparatus 104 is, for example, a liquid crystal display or a projector. The user can perform editing and the like while checking an image that is being processed via the display apparatus 104. The recording medium 105 is, for example, a semiconductor memory, a hard disk drive, a server on a network, or the like. The output apparatus 107 is a printer or the like. The image estimating apparatus 103 can serve to perform developing processing and other image processing (depth enlargement, etc.) if necessary.

Figure 4:
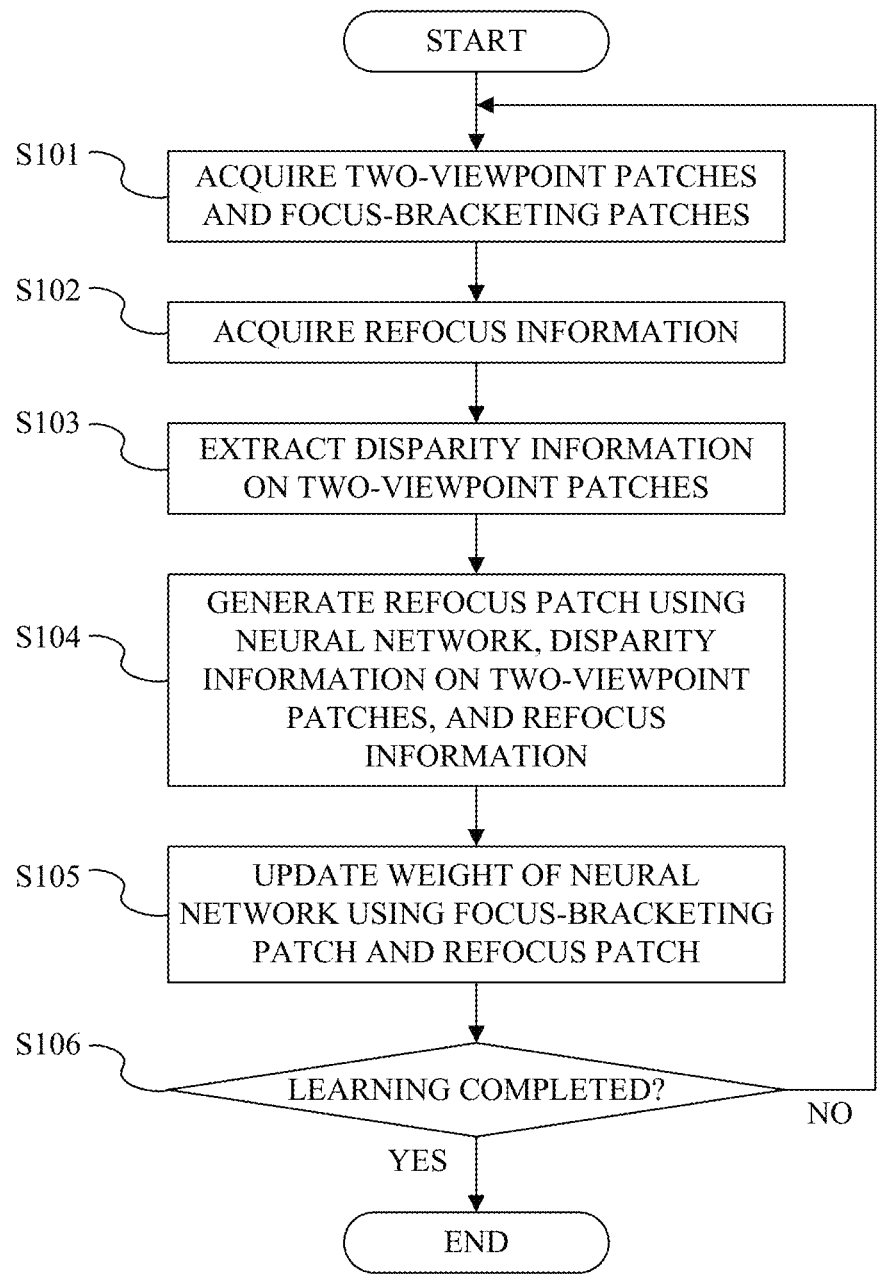
FIG. 4 is a flowchart relating to weight learning according to the first embodiment.

Referring now to FIGS. 1 and 4, a description will be given of a weight learning method (manufacturing method of a learned model) to be executed by the learning apparatus 101 according to this embodiment. FIG. 1 illustrates a flow of weight learning of the neural network (machine learning model). FIG. 4 is a flowchart relating to the weight learning. Each step in FIG. 4 is mainly executed by the image acquiring unit 101*b*, the refocus information acquiring unit 101*c*, and the learning unit 101*d*.

First, in the step S101 of FIG. 4, the image acquiring unit 101*b* acquires two-viewpoint patches (first images) and a plurality of focus-bracketing patches (ground truth images) corresponding to the two-viewpoint patches. In this embodiment, the two-viewpoint patches are images of the same object captured at two different viewpoints, and the focus-bracketing patches are images obtained by capturing the same object at one or more in-focus positions that are different from those of the two-viewpoint patches. The two-view patch includes two images, but this embodiment is not limited to this example. For example, pixel values of the two-viewpoint patch may be arranged alternately in the horizontal direction to form one image. In that case, since the two-viewpoint patch is horizontally longer than the focus-bracketing patch, the size may be adjusted by downsampling in the horizontal direction inside the neural network described below. The viewpoint of the focus-bracketing patch is an intermediate viewpoint between those of the two-view patches, but this embodiment is not limited to this example. For example, the focus-bracketing patches may be images in which the in-focus position of the left viewpoint out of the two viewpoints is moved. The two-viewpoint patches and the focus-bracketing patches are obtained, for example, by rotating a focus ring of the image pickup apparatus a plurality of times to capture images (perform focus-bracketing imaging). A patch is an image having a predetermined number of pixels (such as 128×128 pixels).

Next, in the step S102, the refocus information acquiring unit 101*c* acquires the refocus information. This embodiment uses as the refocus information a moving amount of an in-focus position expressed by a moving amount of an image plane of the image pickup apparatus when the two-viewpoint patches and the focus-bracketing patches are captured by the focus-bracketing imaging. For example, the refocus information may be ±80 in the case where the focus-bracketing patch is imaged by moving the image plane by ±80 μm on the basis of the in-focus position of the two-viewpoint patch. Alternatively, the refocus information may use an amount normalized by a depth of focus Fδ given by an F-number (aperture value) F of the imaging optical system and a diameter δ of a permissible circle of confusion. For example, refocus information may be ±1 in the case where the F-number of the imaging optical system is 4, the diameter of the permissible circle of confusion is 20 and the focus-bracketing patch is imaged by moving the image plane by ±80 Refocus information on the two-viewpoint patch as a reference in-focus position may be set to 0.

Next, in the step S103, the learning unit 101*d* generates a feature map from the two-viewpoint patches (first images) using the first neural network (first machine learning model), and compares them with each other. Thereby, the learning unit 101*d* extracts information on corresponding points in the two-viewpoint patches, that is, disparity information on the two-viewpoint patches. In this embodiment, the feature map comparing method uses a matrix product, but this embodiment is not limited to this example. For example, a classical feature amount for a position alignment such as SIFT, SURF, and HoG may be used, or feature maps may be shifted relative to each other in the horizontal direction and then concatenated in the channel direction. The disparity information on the two-viewpoint patches may be extracted by fixing one of the two-viewpoint patches, shifting the other in the horizontal direction relative to the one, concatenating them in the channel direction, and inputting the concatenated result into the first neural network. Alternatively, the disparity information on the two-viewpoint patch may be extracted by inputting one image in which the pixel values of the two-viewpoint patches are arranged alternately in the horizontal direction to the first neural network.

Next, in the step S104, the learning unit 101*d* uses a second neural network (second machine learning model) to generate a refocus patch (second image) 202. More specifically, the learning unit 101*d* generates the refocus patch 202 based on the refocus information 204 obtained in the step S102, and the disparity information 205 obtained in the step S103 using the second neural network. This embodiment concatenates an image having the refocus information 204 as a pixel value and a feature map as the disparity information 205 in the channel direction and then inputs the concatenated result into the second neural network, but this embodiment is not limited to this example. The refocus patch 202 is an estimation of the focus-bracketing patch 200, and ideally they are equal to each other.

This embodiment uses the configuration of the neural network illustrated in FIG. 1, but this embodiment is not limited to this embodiment. For example, using a single neural network having the functions of the first neural network and the second neural network, this embodiment may generate a refocus patch (second image) 202 based on the two-viewpoint patches (first images) 201 and refocus information 204. In FIG. 1, the first half of the branched network represents the first neural network (first machine learning model), and the latter half of the network represents the second neural network (machine learning model).

CN in FIG. 1 represents a convolutional layer. CN convolutes an input and a filter, adds them to a bias, and nonlinearly transforms the result using an activation function. An initial value of each component of the filter and the bias are arbitrary, and are determined by random numbers in this embodiment. The activation function can use, for example, ReLU (Rectified Linear Unit) or a sigmoid function. A feature map is a multidimensional array output in each layer except the final layer. Therefore, the disparity information 205 is also the feature map in this embodiment. A skip connection 203 combines feature maps output from non-consecutive layers. The feature map may be combined by summing up each element or by concatenation in the channel direction. This embodiment uses the sum of elements.

Reference numeral 206 in FIG. 1 denotes a comparing unit (comparator) for comparing feature maps (first feature amounts) generated by the first neural network (feature amount generating unit) from the two-viewpoint patches (first images) 201. As described above, this embodiment uses the matrix product for the comparing method of the feature maps, but this embodiment is not limited to this embodiment.

An element (block or module) in a dotted frame in FIG. 1 represents a residual block. A network in which the residual blocks are multi-layered is called a residual network, and is widely used for image processing using DL. However, this embodiment is not limited to this example. For example, an inception module may be configured in which convolution layers having different convolution filter sizes are juxtaposed and a plurality of obtained feature maps are integrated to form a final feature map. Alternatively, other elements, such as a dense block having a dense skip connection, may be layered to form a network.

Even if the processing load (the number of convolutions) may be reduced by downsampling the feature map in the layer close to the input, by upsampling the feature map in the layer close to the output, and by reducing the size of the feature map in the intermediate layer. Downsampling of the feature map can use pooling, stride, de-pixel shuffle, and the like. Upsampling of the feature map can use deconvolution or transposed convolution, pixel shuffle, interpolation, and the like.

Next, in the step S105 of FIG. 4, the learning unit 101*d* updates weights of the neural network illustrated in FIG. 1 based on an error between the focus-bracketing patch 200 and the estimated refocus patch (second image) 202. The weight includes a filter component and bias of each layer. An error backpropagation method is used to update the weights, but this embodiment is not limited to this example. Mini-batch learning finds errors between the plurality of focus-bracketing patches 200 and the corresponding refocus patches 202, and updates the weights. An error function (loss function) may use, for example, an L2 norm or an L1 norm. A weight updating method (learning method) is not limited to mini-batch learning, but may be batch learning or online learning. Only the second neural network may be learned with the previously learned weight of the first neural network. That is, the weight of the first neural network may be fixed without learning, and only the second neural network may be learned.

Next, in the step S106, the learning unit 101*d* determines whether or not the weight learning is completed. The completion can be determined by checking whether the number of iterations of learning (weight updating) has reached a predefined value, or whether a weight changing amount in the update is smaller than a predefined value. If the learning unit 101*d* determines that the weight learning has not yet been completed, the flow returns to the step S101, and a plurality of two-viewpoint patches (first image) 201 and focus-bracketing patches 200 are newly acquired. On the other hand, when the learning unit 101*d* determines that the learning has been completed, the learning apparatus 101 ends learning and stores the weight information in the memory 101*a*.

Figure 5:
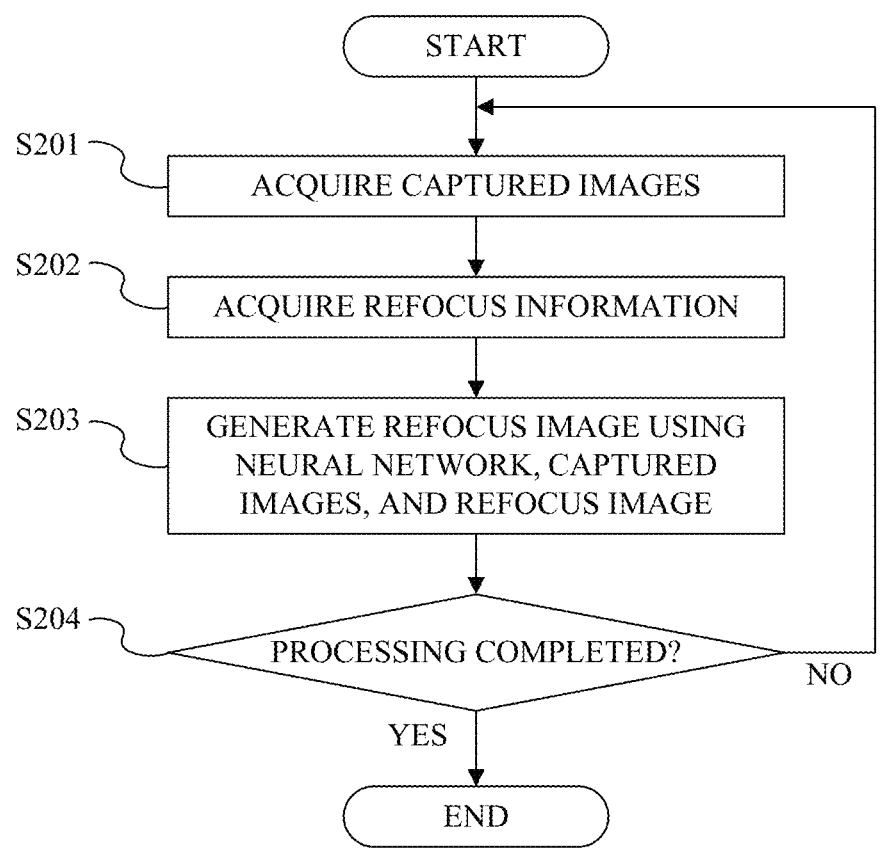
FIG. 5 is a flowchart relating to an estimation of multi-viewpoint images according to the first embodiment.

Referring now to FIG. 5, a description will be given of a generation of the refocus image to be executed by the image estimating apparatus 103 according to this embodiment. FIG. 5 is a flowchart relating to the generation of the refocus image. Each step in FIG. 5 is mainly executed by the image acquiring unit 103*b*, the refocus information acquiring unit 103*c*, and the image processing unit 103*d* of the image estimating apparatus 103.

First, in the step S201, the image acquiring unit 103*b* acquires captured images. The captured images are two-viewpoint images as in the case of learning, and transmitted from the image pickup apparatus 102 in this embodiment.

Next, in the step S202, the refocus information acquiring unit 103*c* acquires refocus information. The refocus information is arbitrarily set by the user, for example. The refocus information is an amount for virtually moving an in-focus position of a two-viewpoint image that is the captured image, and uses an amount expressed as a moving amount of an image plane of the image pickup apparatus as in learning.

Next, in the step S203, the image processing unit 103*d* generates a refocus image (output image) using the neural network, the captured images, and the refocus information. The refocus image is an estimation of one of the acquired focus-bracketing images if images are captured by the focus-bracketing imaging at in-focus positions different from that of the captured image. A neural network having a configuration similar to that of FIG. 1 is used to generate the refocus image. The weight information has been transmitted from the learning apparatus 101 and stored in the memory 103*a*. In inputting the captured images into the neural network, it is unnecessary to cut it out to the same size as that of the two-viewpoint patch that has been used for learning, but for expedited processing, the captured images may be decomposed into multiple patches that overlap each other and then processed. In this case, the patches obtained after the processing may be combined to form a refocus image.

This embodiment estimates the refocus image using the arbitrarily settable refocus information. Thus, the user's request for refocusing can be reflected with high accuracy. This embodiment can generate a refocus image from two-viewpoint images with high accuracy using DL.

Finally, other advantages of this embodiment over prior art will be described. Japanese Patent No. 6370348 discloses a method of generating a refocus image from two-viewpoint images without using DL. The two-viewpoint images in the method disclosed in Japanese Patent No. 6370348 have disparity information only in the horizontal direction and do not have disparity information in the vertical direction, and thus the blur does not change in the vertical direction and becomes unnatural. On the other hand, this embodiment can estimate disparity information in the vertical direction in the focus-bracketing image as the ground truth images based on disparity information in the horizontal direction extracted from two-viewpoint images and refocus information, and thus can generate a refocus image with high accuracy.

Next, the method disclosed in Busam et al. decomposes a captured image in a depth direction and blurs it for each depth. However, the depth resolution is generally low, the captured image cannot be continuously decomposed in the depth direction, and it is thus difficult to generate a refocus image in which an in-focus position is continuously (arbitrarily) moved. On the other hand, this embodiment learns using the focus-bracketing images as the ground truth images in which the in-focus positions are continuously moved. Thereby, once the refocus information is designated, a refocus image can be generated in which an in-focus position is continuously (arbitrarily) moved.

The method disclosed in Busam et al. requires a captured image to be an all-focused image so as to decompose it in a depth direction and to blur it for each depth, and thus cannot generate a refocus image with high accuracy in a general image. On the other hand, this embodiment, for example, sharpens a foreground of the captured image and smooths a background based on disparity information and refocus information, so that a captured image does not have to be an all-focused image. Therefore, this embodiment can generate a refocus image with high accuracy even from a general image in which various blurs are added to the foreground and background.

The method disclosed in Busam et al. needs a depth map corresponding to a captured image for learning, and thus cannot provide highly accurate processing for this reason. On the other hand, this embodiment needs no ground truth disparity (depth) image, since information extracted from two-viewpoint images is disparity information so as to generate a refocus image with high accuracy. Since no ground truth disparity image is necessary which is difficult to prepare, highly accurate processing is available.

In this embodiment, the learning apparatus 101 and the image estimating apparatus 103 are separate units as an example, but the present invention is not limited to this embodiment. The learning apparatus 101 and the image estimating apparatus 103 may be integrated with each other. That is, learning (process illustrated in FIG. 4) and estimation (process illustrated in FIG. 5) may be performed in an integrated unit.

Thus, in this embodiment, the image processing apparatus (image estimating apparatus 103) includes an acquiring unit (image acquiring unit 103b, refocus information acquiring unit 103c) and a generating unit (image processing unit 103d). The acquiring unit acquires a first image (such as a captured image) having disparity information and refocus information. The generating unit inputs the first image or the disparity information and the refocus information into the machine learning model, and generates a second image (refocus image) having an in-focus position different from an in-focus position of the first image based on the refocus information. The refocus information is information on a distance between the in-focus position of the first image and the in-focus position of the second image. The first image may be stereo images of the same object captured at two different viewpoints, two disparity images generated by recording light fluxes that have passed through two different pupil areas in an optical system, or a single image made by combining the stereo images or the two disparity images.

In this embodiment, the image processing apparatus (learning apparatus 101) includes the image acquiring unit 101b, the refocus information acquiring unit 101c, and the learning unit 101d. The image acquiring unit acquires the first image having disparity information and the ground truth image (such as a focus-bracketing image). The refocus information acquiring unit acquires refocus information on the distance between the in-focus position of the first image and the in-focus position of the ground truth image. The learning unit learns the machine learning model using the ground truth image and the second image generated by inputting the first image and the refocus information into the machine learning model. The learning unit inputs the first image into the machine learning model, generates the second image having an in-focus position different from an in-focus position of the first image based on the refocus information, and learns the machine learning model based on an error between the second image and the ground truth image.

Second Embodiment

Next follows a description of an image processing system according to a second embodiment of the present invention. Similar to the first embodiment, this embodiment learns and executes image processing using DL for estimating a refocus image from two-viewpoint images using the neural network. The image processing system according to this embodiment is different from that of the first embodiment in that the image pickup apparatus acquires captured images (two-viewpoint images) and performs image processing.

Figure 6:
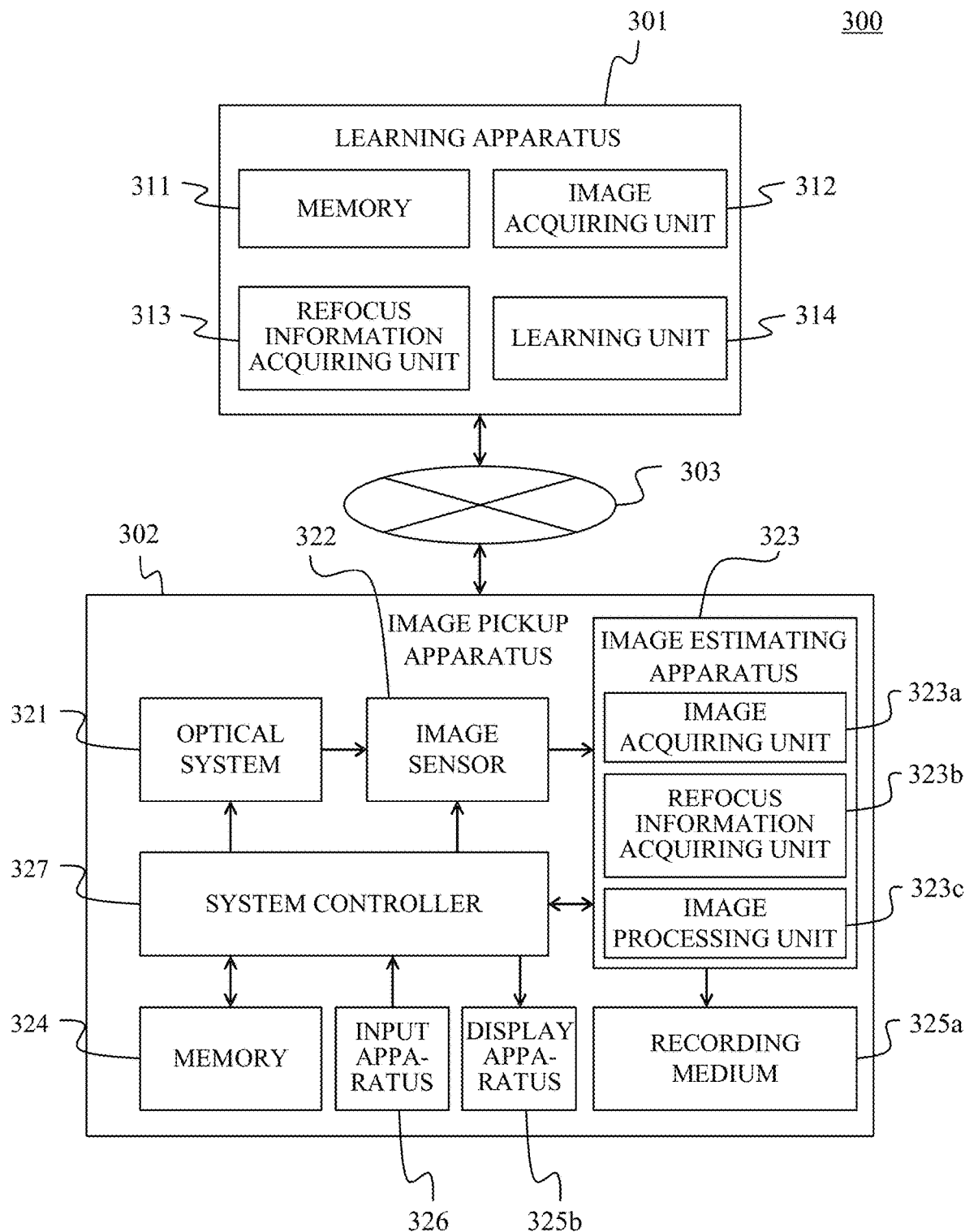
FIG. 6 is a block diagram of an image processing system according to a second embodiment.
Figure 7:
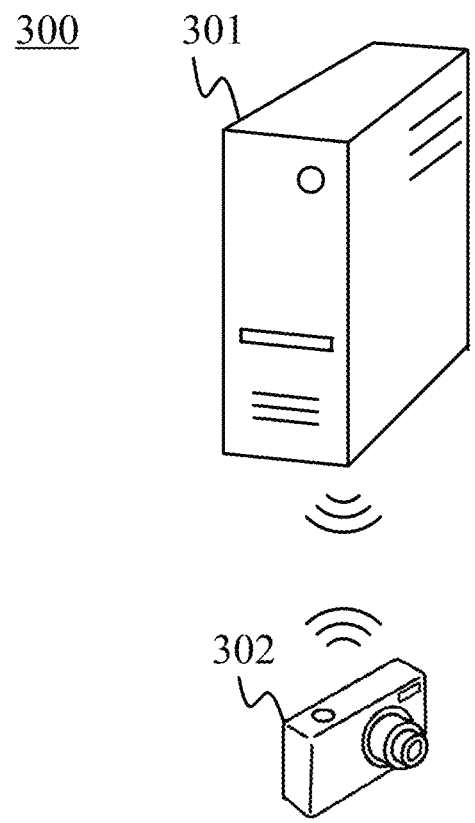
FIG. 7 is an external view of the image processing system according to the second embodiment.

FIG. 6 is a block diagram of an image processing system 300 according to this embodiment. FIG. 7 is an external view of the image processing system 300. The image processing system 300 includes a learning apparatus 301 and an image pickup apparatus 302 connected to each other via a network 303. The learning apparatus 301 and the image pickup apparatus 302 do not have to be always connected to each other via the network 303.

The learning apparatus 301 includes a memory 311, an image acquiring unit 312, a refocus information acquiring unit 313, and a learning unit 314. Using them, the learning apparatus 301 learns weights of the neural network in order to perform image processing for estimating the refocus image from the two-viewpoint images.

The image pickup apparatus 302 captures an object space, acquires captured images (two-viewpoint images), and generates a refocus image from the two-viewpoint images. Details of image processing to be executed by the image pickup apparatus 302 will be described below. The image pickup apparatus 302 includes an optical system 321 and an image sensor 322. The image estimating unit 323 includes an image acquiring unit 323a, a refocus information acquiring unit 323b, and an image processing unit 323c.

In this embodiment, learning of the weights of the neural network to be executed by the learning apparatus 301 is similar to that of the first embodiment. Only the details regarding the image processing to be executed by the image pickup apparatus 302 will be described below.

The weight information on the neural network is previously learned by the learning apparatus 301 and stored in the memory 311. The image pickup apparatus 302 reads the weight information out of the memory 311 via the network 303 and stores it in the memory 324. The image estimating unit 323 generates a refocus image from the two-viewpoint images in the image processing unit 323c using the weight information on the learned neural network stored in the memory 324 and the refocus information acquired by the refocus information acquiring unit 323b. The generated refocus image is stored in the recording medium 325a. When the user gives a command regarding a display of the refocus image, a stored image is read out and displayed on the display unit 325b. The captured image stored in the recording medium 325a may be read out, and the image estimating unit 323 may generate the refocus image. When the user gives a command, a depth-enlarged image may be generated by combining a plurality of refocus images having different focus positions. The above series of control is performed by a system controller 327.

Next follows a description of a generation of the refocus image to be executed by the image estimating unit 323 according to this embodiment. The procedure of image processing is almost similar to that of FIG. 5 in the first embodiment. Each step in the image processing is mainly executed by the image acquiring unit 323a, the refocus information acquiring unit 323b, and the image processing unit 323c in the image estimating unit 323.

First, in the step S201, the image acquiring unit 323a acquires captured images (two-viewpoint images). The two-viewpoint images have been acquired by the image pickup apparatus 302 and stored in the memory 324.

Next, in the step S202, the refocus information acquiring unit 323b acquires refocus information. The refocus information is an amount for virtually moving the in-focus position of the two-viewpoint image as the captured image, and may use an amount instructed by the user via the input unit 326 or a predetermined amount stored in the memory 324.

Next, in the step S203, the image processing unit 323c generates a refocus image using a neural network, the captured images, and the refocus information. The weights of the learned neural network use information stored in the memory 324. The neural network according to this embodiment has a configuration similar to that illustrated in FIG. 1.

This embodiment can provide an image processing system that can generate a refocus image from two-viewpoint images with high accuracy.

Third Embodiment

Next follows a description of an image processing system according to a third embodiment of the present invention. The image processing system according to this embodiment is different from the image processing systems of the first and second embodiments in having a processing apparatus (computer) that transmits captured images (two-viewpoint images) to be image-processed to an image estimating apparatus and receives a processed output image (refocus image) from the image estimating apparatus.

Figure 8:
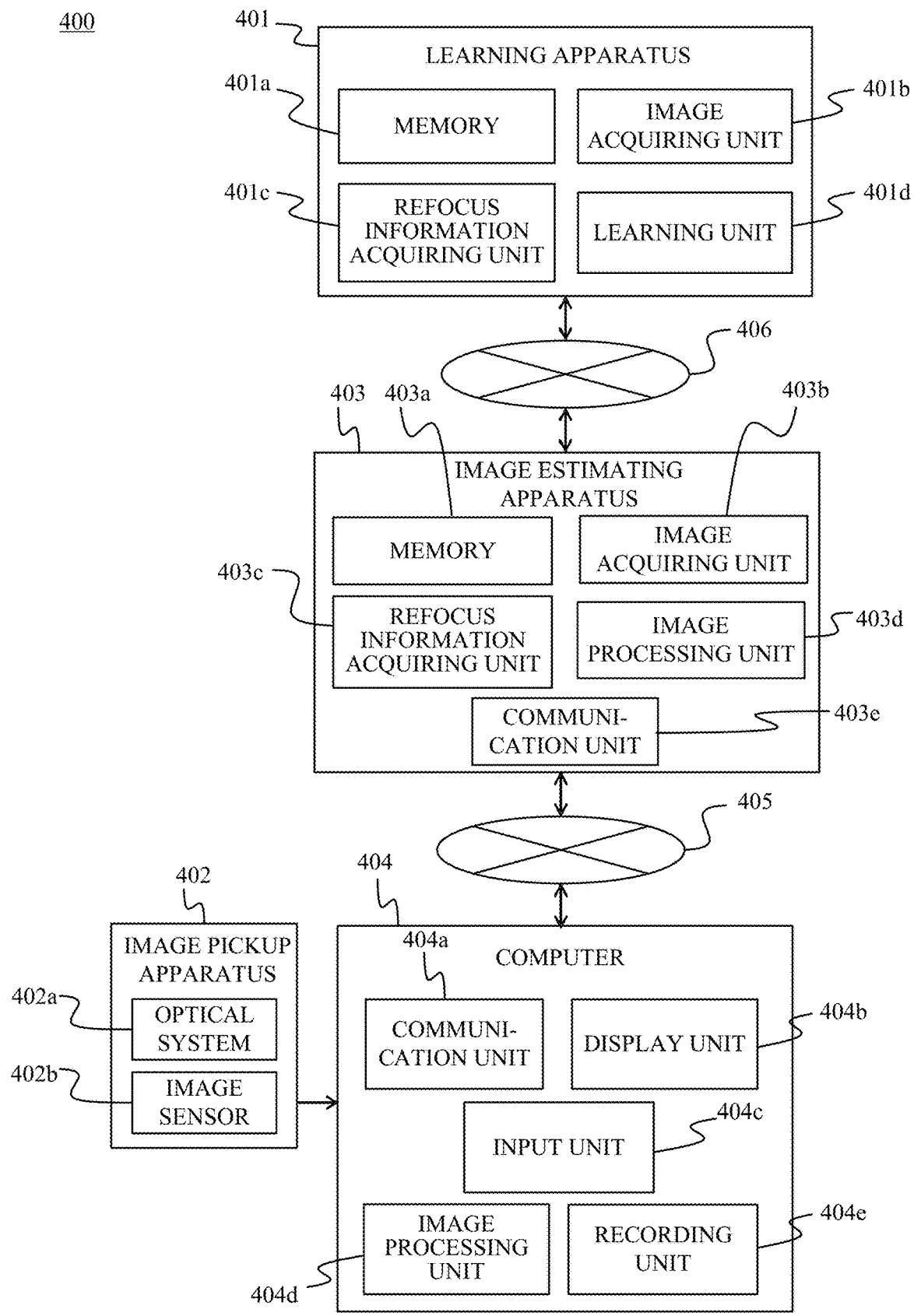
FIG. 8 is a block diagram of an image processing system according to a third embodiment.

FIG. 8 is a block diagram of an image processing system 400 according to this embodiment. The image processing system 400 includes a learning apparatus 401, an image pickup apparatus 402, an image estimating apparatus (second apparatus) 403, and a computer (processing apparatus, first apparatus) 404. The learning apparatus 401 and the image estimating apparatus 403 are, for example, servers. The computer 404 is, for example, a user terminal (personal computer or smartphone). The computer 404 is connected to the image estimating apparatus 403 via a network 405. The image estimating apparatus 403 is connected to the learning apparatus 401 via a network 406. That is, the computer 404 and the image estimating apparatus 403 are communicable with each other, and the image estimating apparatus 403 and the learning apparatus 401 are communicable with each other.

Since the configuration of the learning apparatus 401 is similar to that of the learning apparatus 101 of the first embodiment, a description thereof will be omitted. Since the configuration of the image pickup apparatus 402 is similar to that of the image pickup apparatus 102 of the first embodiment, a description thereof will be omitted.

The image estimating apparatus 403 includes a memory 403a, an image acquiring unit 403b, a refocus information acquiring unit 403c, an image processing unit 403d, and a communication unit (receiving unit) 403e. The memory 403a, the image acquiring unit 403b, the refocus information acquiring unit 403c, and the image processing unit 403d are similar to the memory 103a, the image acquiring unit 103b, the refocus information acquiring unit 103c, and the image processing unit 103d in the image estimating apparatus 103 according to the first embodiment. The communication unit 403e has a function of receiving a request transmitted from the computer 404 and a function of transmitting an output image (refocus image) generated by the image estimating apparatus 403 to the computer 404.

The computer 404 includes a communication unit (transmitting unit) 404a, a display unit 404b, an input unit 404c, an image processing unit 404d, and a recording unit 404e. The communication unit 404a has a function of transmitting the request for causing the image estimating apparatus 403 to perform processing for the captured images (two-viewpoint images) to the image estimating apparatus 403, and a function of receiving the output image (refocus image) processed by the image estimating apparatus 403. The display unit 404b has a function of displaying various information. The information displayed by the display unit 404b includes, for example, the captured images (two-viewpoint images) transmitted to the image estimating apparatus 403 and the output image (refocus image) received from the image estimating apparatus 403. An instruction to start image processing from the user etc. is input to the input unit 404c. The image processing unit 404d further has a function of performing image processing on the output image (refocus image) received from the image estimating apparatus 403. The image processing includes depth enlargement in which a plurality of refocus images having different in-focus positions are combined. The recording unit 404e stores the captured images acquired from the image pickup apparatus 402, the output image received from the image estimating apparatus 403, and the like.

Next follows a description of the image processing according to this embodiment. The image processing in this embodiment is equivalent to the image processing (FIG. 5) described in the first embodiment.

Figure 9:
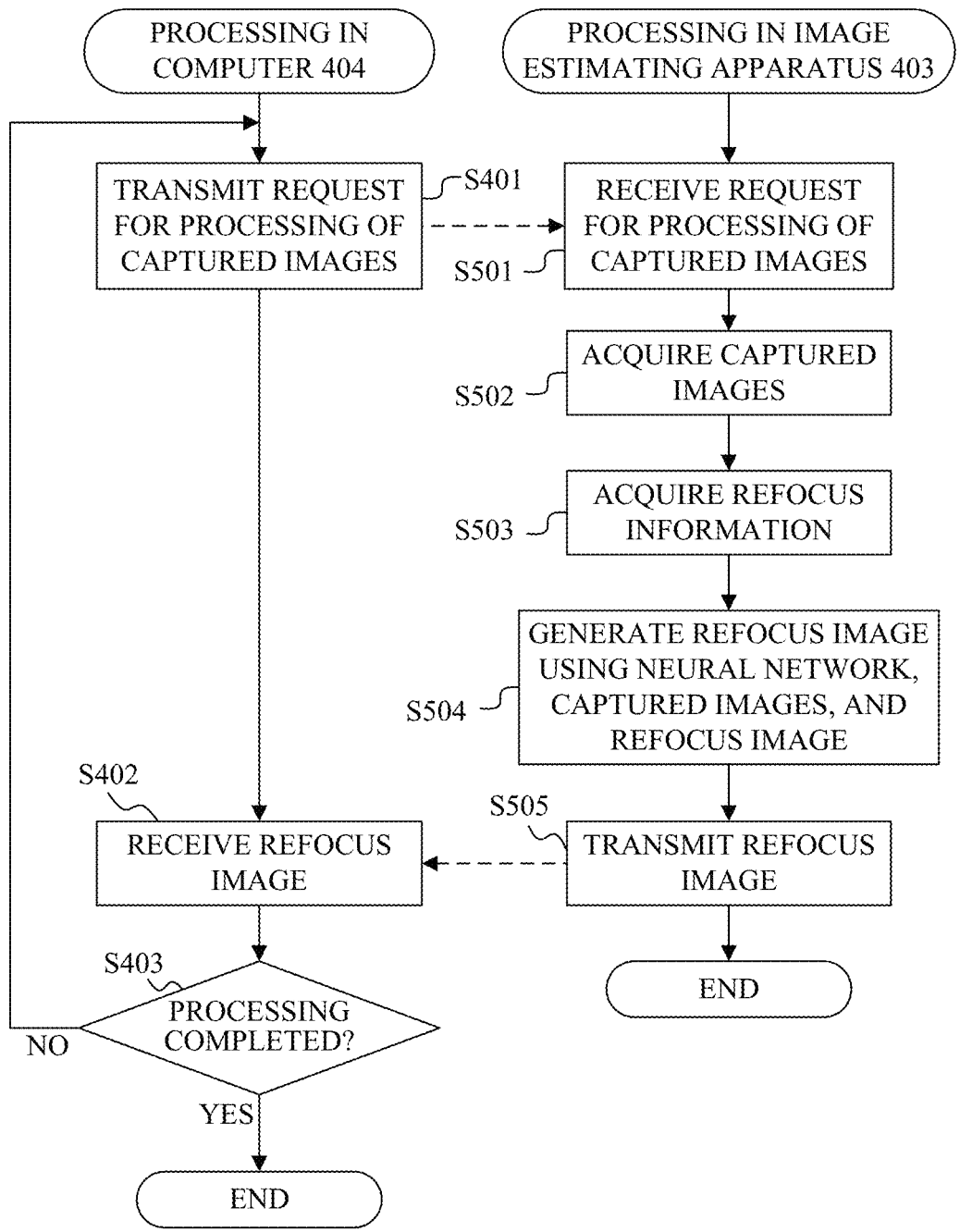
FIG. 9 is a flowchart relating to an estimation of multi-viewpoint images according to the third embodiment.

The image processing illustrated in FIG. 9 is started when the user gives the instruction to start the image processing via the computer 404. First, the operation in the computer 404 will be described.

First, in the step S401, the computer 404 transmits a processing request for the captured images (two-viewpoint images) to the image estimating apparatus 403. The method of transmitting the two-viewpoint images to be processed to the image estimating apparatus 403 is not limited. For example, the two-viewpoint images may be uploaded to the image estimating apparatus 403 at the same time as or before the step S401. The two-viewpoint images may be images stored on a server different from the image estimating apparatus 403. In the step S401, the computer 404 may transmit an ID for authenticating the user, information on an imaging condition, and the like, as well as the processing request for the two-viewpoint images.

Next, in the step S402, the computer 404 receives the output image (refocus image) generated in the image estimating apparatus 403.

Next, the operation of the image estimating apparatus 403 will be described. First, in the step S501, the image estimating apparatus 403 receives the processing request for the captured images (two-viewpoint images) transmitted from the computer 404. The image estimating apparatus 403 determines that the processing for the two-viewpoint image has been instructed, and executes the processing subsequent to the step S502.

Next, in the step S502, the image acquiring unit 403b acquires the captured images. The captured images are transmitted from the computer 404. Next, in the step S503, the refocus information acquiring unit 403c acquires the refocus information. The refocus information is an amount for virtually moving the in-focus position of the two-viewpoint image as the captured image. The refocus information may use a user-instructed amount via the input unit 404c or a predetermined amount stored in the memory 403a. The step S504 is similar to the step S203 of the first embodiment. Next, in the step S505, the image estimating apparatus 403 transmits the output image (refocus image) to the computer 404.

As described above, the image estimating apparatus 403 may be controllable by the computer 404 communicatively connected to the image estimating apparatus 403.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In each embodiment, the refocus information can be arbitrarily set by the user, so that the user's request for refocus can be reflected with high accuracy. Therefore, according to each embodiment, an image processing method for generating a refocus image from a two-viewpoint image with high accuracy using a DL, an image processing apparatus, a storage medium, a method for manufacturing a trained model, and an image processing system are provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-081785, filed on May 13, 2021, which is hereby incorporated by reference herein in its entirety.

What is claimed is:

1. An image processing method comprising:
a first step of acquiring a first image having disparity information and refocus information; and
a second step of inputting the first image or the disparity information and the refocus information into a machine learning model, and of generating a second image having an in-focus position different from an in-focus position of the first image based on the refocus information,
wherein the refocus information is information on a distance between the in-focus position of the first image and the in-focus position of the second image,
wherein the machine learning model includes a first machine learning model and a second machine learning model, and
wherein the second step includes the steps of:
inputting two viewpoint images acquired from the first image into the first machine learning model and extracting the disparity information; and
inputting the disparity information and the refocus information into the second machine learning model and generating the second image.

2. The image processing method according to claim 1, wherein the first image is stereo images of the same object captured at two different viewpoints, two disparity images generated by recording light fluxes that have passed through two different pupil areas in an optical system, or a single image made by combining the stereo images or the two disparity images.

3. The image processing method according to claim 1, wherein the machine learning model includes:
a feature amount generating unit configured to input two viewpoint images acquired from the first image into a neural network and to generate first feature amounts relating to two feature maps; and
a comparison unit configured to compare the first feature amounts with each other and generates the disparity information.

4. The image processing method according to claim 3, wherein the second step compares the first feature amounts with each other through processing based on a matrix product of the two feature maps.

5. The image processing method according to claim 1, wherein the second step concatenates two viewpoint images acquired from the first image in a channel direction and inputs a concatenated result into the machine learning model.

6. The image processing method according to claim 1, wherein the second step fixes one of the two viewpoint images acquired from the first image, shifts the other, concatenates the two viewpoint images in a channel direction, and inputs a concatenated result into the machine learning model.

7. The image processing method according to claim 1, wherein the distance is an amount based on a moving amount of an imaging plane of an image pickup apparatus when the image pickup apparatus acquires the second image that is made by capturing the same object as that of the first image at a different in-focus position from that of the first image through virtually focus-bracketing imaging.

8. A non-transitory computer-readable storage medium storing a program that causes a computer to execute the image processing method according to claim 1.

9. An image processing method comprising:
a first step of acquiring a first image having disparity information and refocus information; and
a second step of inputting the first image or the disparity information and the refocus information into a machine learning model, and of generating a second image having an in-focus position different from an in-focus position of the first image based on the refocus information,
wherein the refocus information is information on a distance between the in-focus position of the first image and the in-focus position of the second image, and
wherein the second step concatenates, in a channel direction, the first image or at least one of feature maps acquired by inputting the first image into the machine learning model, and the refocus information on an image having the distance between the in-focus position of the first image and the in-focus position of the second image as a pixel value, and processes a concatenated result in the machine learning model.

10. An image processing method comprising:

a first step of acquiring a first image having disparity information and refocus information; and a second step of inputting the first image or the disparity information and the refocus information into a machine learning model, and of generating a second image having an in-focus position different from an in-focus position of the first image based on the refocus information, wherein the refocus information is information on a distance between the in-focus position of the first image and the in-focus position of the second image, and wherein the second step concatenates, in a channel direction, a feature map relating to the disparity information on the first image and the refocus information on an image having the distance between the in-focus position of the first image and the in-focus position of the second image as a pixel value, and processes a concatenated result in the machine learning model.

11. An image processing apparatus comprising:

at least one processor; and at least one memory coupled to the at least one processor storing instructions that, when executed by the at least one processor, cause the at least one processor to function as:

an acquiring unit configured to acquire a first image having disparity information and refocus information; and a generating unit configured to input the first image or the disparity information and the refocus information into a machine learning model, and to generate a second image having an in-focus position different from an in-focus position of the first image based on the refocus information, wherein the refocus information is information on a distance between the in-focus position of the first image and the in-focus position of the second image, wherein the machine learning model includes a first machine learning model and a second machine learning model, and wherein the generating unit
inputs two viewpoint images acquired from the first image into the first machine learning model and extracts the disparity information, and
inputs the disparity information and the refocus information into the second machine learning model and generates the second image.

12. An image processing system comprising:

the image processing apparatus according to claim 11; and a controlling apparatus communicable with the image processing apparatus, wherein the controlling apparatus includes a transmitting unit configured to transmit a request that causes the image processing apparatus to process a first image having disparity information, wherein the image processing apparatus includes:

a receiving unit configured to receive the request transmitted from the transmitting unit.

* * * * *